United States Patent
Fukuzaki et al.

(10) Patent No.: US 9,765,917 B2
(45) Date of Patent: Sep. 19, 2017

(54) VACUUM INSULATION MATERIAL

(71) Applicant: SAMSUNG ELECTRONICS CO., LTD., Suwon-si, Gyeonggi-do (KR)

(72) Inventors: Tomokazu Fukuzaki, Yokohama (JP); Kenichi Nagayama, Yokohama (JP); Mitsuharu Kimura, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 79 days.

(21) Appl. No.: 14/979,681

(22) Filed: Dec. 28, 2015

(65) Prior Publication Data
US 2016/0186918 A1    Jun. 30, 2016

(30) Foreign Application Priority Data

Dec. 26, 2014  (JP) .................................. 2014-266452
Jul. 1, 2015  (KR) ........................ 10-2015-0093883

(51) Int. Cl.
| *F16L 59/065* | (2006.01) |
| *C22C 30/02* | (2006.01) |
| *C22C 30/00* | (2006.01) |
| *C22C 18/00* | (2006.01) |
| *F16L 59/08* | (2006.01) |

(52) U.S. Cl.
CPC ............ *F16L 59/065* (2013.01); *C22C 18/00* (2013.01); *C22C 30/00* (2013.01); *C22C 30/02* (2013.01); *F16L 59/08* (2013.01)

(58) Field of Classification Search
CPC ..... Y10T 428/231; F16L 59/065; E04B 1/803
USPC ............................................................ 428/69
See application file for complete search history.

(56) References Cited

U.S. PATENT DOCUMENTS

| 5,571,344 A | 11/1996 | Dubois et al. |
| 5,649,282 A | 7/1997 | Dubois et al. |
| 5,888,661 A | 3/1999 | Dubois et al. |
| 6,183,887 B1 | 2/2001 | Dubois et al. |
| 6,964,818 B1 | 11/2005 | Darolia |
| 2010/0227194 A1 | 9/2010 | Stamm |
| 2012/0132659 A1 | 5/2012 | Hwang |

FOREIGN PATENT DOCUMENTS

| JP | 61-125577 A | 6/1986 |
| JP | 11-293334 A | 10/1999 |
| JP | 3153553 B2 | 1/2001 |
| JP | 2002-310561 A | 10/2002 |
| JP | 2009-530498 A | 8/2009 |
| JP | 2010-190304 A | 9/2010 |
| KR | 1020110015325 A | 2/2011 |

*Primary Examiner* — Alexander Thomas
(74) *Attorney, Agent, or Firm* — Cantor Colburn LLP

(57) ABSTRACT

A vacuum insulation material including: a core material; and a gas adsorbing agent, wherein the core material and the gas absorbing agent are interposed between a pair of gas barrier materials, wherein at least one of the pair of gas barrier materials includes a quasicrystal metal layer including a quasicrystal metal. The vacuum insulation material may reduce the heat bridge while maintaining high gas barrier properties.

8 Claims, 1 Drawing Sheet

VACUUM INSULATION MATERIAL

CROSS REFERENCE TO RELATED APPLICATIONS

This application claims priority to and the benefit of Japanese Patent Application No. 2014-266452, filed in the Japanese Intellectual Property Office on Dec. 26, 2014, and Korean Patent Application No. 10-2015-0093883, filed in the Korean Intellectual Property Office on Jul. 1, 2015, and all the benefits accruing therefrom under 35 U.S.C. §119, the entire contents of which are incorporated herein by reference.

BACKGROUND

1. Field

This disclosure relates to a vacuum insulation material. Particularly, the disclosure relates to a vacuum insulation material being capable of effectively reducing a heat bridge of an exterior of a material.

2. Description of the Related Art

Heat insulating materials have been used in refrigerators, vending machines, cooling boxes, or the like, and recently, a vacuum insulation material has been widely used as a heat insulating material having an excellent heat insulation performance.

The vacuum insulation material has a structure in which a heat insulating core material, such as a glass fiber, asbestos, expanded polyurethane, or expanded polystyrene is disposed in an envelope-shaped air-tight exterior material and sealed by vacuum evacuating the inside thereof.

The exterior material includes a material having high gas barrier properties in order to maintain vacuum inside thereof for a long time, and simultaneously, to prevent gas invasion from the outside. As the material having excellent gas barrier properties, an aluminum foil has been generally employed.

Since the aluminum foil has a sufficient gas barrier performance but high thermal conductivity, a heat bridge may easily occur along the exterior of the material, and the heat insulation performance may be deteriorated. Accordingly, there remains a need for improved insulation material.

SUMMARY

Disclosed is a vacuum insulation material including: a core material; and a gas adsorbing agent, wherein the core material and the gas absorbing agent are interposed between a pair of gas barrier materials, wherein at least one of the pair of gas barrier materials comprises a quasicrystal metal layer comprising a quasicrystal metal.

BRIEF DESCRIPTION OF THE DRAWING

The above and other advantages and features of this disclosure will become more apparent by describing in further detail exemplary embodiments thereof with reference to the accompanying drawing, in which.

DETAILED DESCRIPTION

Figure 1A:
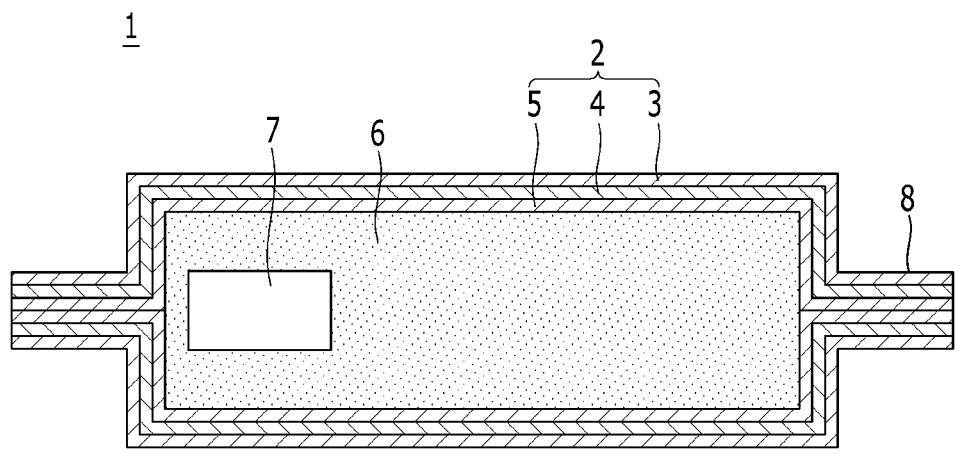
FIGS. 1A and 1B are a schematic cross-sectional views each showing an embodiment of a vacuum insulation material.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An aluminum deposition layer can have poor gas barrier properties and thus may not prevent gas invasion from the outside, and a vacuum degree inside the vacuum insulation material may not be maintained for a sufficient time when using aluminum. In addition, an aluminum deposition layer can have an undesirable heat bridge.

Accordingly, disclosed is a vacuum insulation material capable of reducing the heat bridge while maintaining high gas barrier properties.

The inventors found that the problems may be solved by using a quasicrystal metal layer as a gas barrier material.

In other words, the objectives are accomplished with a vacuum insulation material in which a core material and a gas adsorbing agent are interposed by both surfaces of a pair of gas barrier materials having gas barrier properties and sealed by reducing the inside pressure, wherein at least one of the pair of gas barrier materials having gas barrier properties includes a quasicrystal metal layer formed with a quasicrystal metal.

The disclosed vacuum insulation material may reduce the heat bridge while maintaining the desirable gas barrier properties.

In order to reduce the heat bridge of a vacuum insulation material, a laminate structure of an aluminum deposition layer and a polymeric material has been used on one side of a gas barrier material, as disclosed in Japanese Patent Application No. 61-125577, the content of which is included herein by reference in its entirety.

Disclosed is a vacuum insulation material in which a core material and a gas adsorbing agent are interposed between a pair of gas barrier materials and sealed by reducing the inside pressure, wherein at least one of the pair of gas barrier materials comprises a quasicrystal metal layer comprising a quasicrystal metal.

The embodiment includes a quasicrystal metal layer in the gas barrier material of the vacuum insulation material. By the disclosed structure, it may reduce the heat bridge of the gas barrier material part and also improve the gas barrier properties. Herein, the mechanisms of the working effect of the embodiment may be assumed to be as follows, but are not limited thereto.

The gas barrier material includes a laminate structure of a metal layer and a polymeric film having gas barrier properties, and a thickness of the metal layer may cause a heat bridge. Specifically, since significant heat is returned from peripheral parts of the gas barrier material along the metal layer if the metal layer is thick, the heat bridge is increased. In other words, a thickness of the metal layer and generation of the heat bridge have a positive relationship.

On the other hand, the quasicrystal metal layer is thin and also has high heat resistance (low thermal conductivity) and excellent gas barrier properties. Thus, it may maintain the vacuum degree inside the vacuum insulation material for a long time. Thereby, by using the thin (low thickness) quasicrystal metal layer, heat returned from peripheral parts along the gas barrier material may suppressed and be reduced. Therefore, by using the gas barrier material according to one embodiment, the heat bridge is effectively suppressed and/or inhibited. In addition, since the quasicrystal metal layer is easily coated by sputtering and the like, it is desirable for mass production and the like.

Generally, for manufacturing a vacuum insulation material, a core material and a gas adsorbing agent are enclosed in a pair of gas barrier materials having gas barrier properties and sealed by reducing the inside pressure, but, in this case, the terminal ends of gas barrier materials are attached to each other to provide a convex bonding part (seal part). The bonding part is bent in the product, but when the gas barrier material has a thick thickness, the flexibility of the bonding part is too low to bend closely to the main body of the vacuum insulation material accommodating the core material and the gas adsorbing agent.

Also, the quasicrystal metal layer is easily formed in a thin film and simultaneously has excellent gas barrier properties due to the thin thickness. Thereby, in the gas barrier material according to one embodiment, the bonding part is easily and closely bent to the side of the main body of the vacuum insulation material such that it has excellent workability. That is, the vacuum insulation material according to the present invention has excellent gas barrier properties and workability.

Therefore, the vacuum insulation material according to the present embodiment has low thermal conductivity, effectively suppresses generation of a heat bridge, and has improved gas barrier properties and workability. The vacuum insulation material according to the present embodiment may be applied to a refrigerator, a freezer, and the like, as a vacuum insulation material.

Hereinafter, exemplary embodiments are described.

However, the present invention is not limited to only the following embodiments.

In addition, for better understanding and the ease of description, the dimensional ratios are exaggerated in the drawing, so may be different from the actual ratios.

In the specification, the range of "X-Y" means greater than or equal to X and less than or equal to Y. Furthermore, unless defined otherwise, the operating and measuring properties and the like are performed under the conditions of room temperature of 20 to 25° C. and relative humidity of 40 to 50%.

Vacuum Insulation Material

Figure 1B:
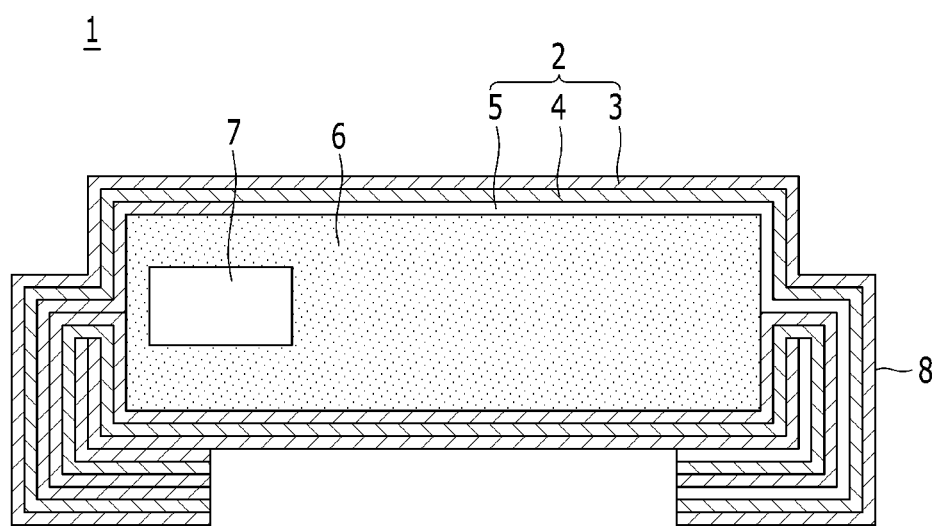

FIGS. 1A and 1B are schematic cross-sectional views showing an example of a vacuum insulation material.

As shown in FIG. 1A, the vacuum insulation material 1 has a structure in which a core material 6 and a gas adsorbing agent 7 are interposed by both surfaces of two sheets of gas barrier materials 2. The gas barrier materials 2 may have a laminate structure (laminate film) of a quasicrystal metal layer 4 and polymeric films 3 and 5.

As described above, since the quasicrystal metal layer is thin and has improved gas barrier properties, heat returned from peripheral parts along the gas barrier material 2 may be suppressed to be lowered. Thereby, the gas barrier material according to the present embodiment may efficiently suppress and/or inhibit a heat bridge.

Herein, the vacuum insulation material 1 is obtained by sealing peripheral parts of the laminate structure (for example, a heat seal) to provide an envelope-shaped gas barrier material; accommodating a core material 6 and a gas adsorbing agent 7 in the gas barrier material 2; reducing pressure inside thereof; and sealing the opening (for example, heat sealing). Thereby, as shown in FIGS. 1A and 1B, a bonding part (seal part) 8 in which gas barrier materials (laminate structures) are attached to each other exists at the peripheral parts (terminal ends) of the gas barrier materials (laminate structure) 2.

The bonding part 8 is bent to the main body side of the vacuum insulation material, as shown in FIG. 1B, to provide a vacuum insulation material product.

As is further described above, the gas barrier material (particularly, a quasicrystal metal layer) may be formed in a thin film shape and have improved gas barrier properties in spite of a thin thickness, and the bonding part may be closely attached to the main body of the vacuum insulation material with ease. Therefore, in the present embodiment, even though the bonding part is bent, it may effectively suppress and/or inhibit a heat bridge through which heat inflows from the surface of the vacuum insulation material, and thereby the vacuum insulation material simultaneously has improved heat insulation performance, excellent gas barrier properties, and high reliability.

Hereinafter, each member of the vacuum insulation material according to an embodiment is further described.

An embodiment includes the quasicrystal metal layer in a gas barrier material.

Gas Barrier Material

The composition of the gas barrier material is not particularly limited, and the gas barrier material desirably may include a laminated structure of a quasicrystal metal layer and a polymeric material. In other words, at least one of a pair of gas barrier materials having gas barrier properties desirably includes a laminated structure of a quasicrystal metal and a polymeric material.

Herein, the vacuum insulation material may include a pair of gas barrier materials, but at least one of two gas barrier materials may include a laminated structure of a quasicrystal metal layer and a polymeric material; or both gas barrier materials may include a laminate structure of a quasicrystal metal layer and a polymeric material.

In the former case, the gas barrier material that is not the laminate structure of a quasicrystal metal layer and a polymeric material not particularly limited, and may be, for example: a metal foil of at least one of aluminum, iron, gold, silver, copper, nickel, stainless steel (SUS), tin, titanium, platinum, lead, cobalt, zinc, carbon steel, and the like, and/or an alloy foil of at least two kind thereof; a deposition film of aluminum, nickel, cobalt, zinc, gold, silver, copper, silicon oxide, alumina, magnesium oxide, titanium oxide, and the like; and/or a laminate structure of an alloy deposition film of at least two kinds thereof and a polymeric material.

Herein, the term "quasicrystal metal" refers to a metal phase having long range order but having no translational symmetry, and has a semi-periodic structure (e.g., irregular periodic structure). The quasicrystal metal has a medium structure between the crystalline metal material and the amorphous metal material. The quasicrystal metal is confirmed by analyzing the long-range order from the diffraction point according to the electron diffraction, and the semi-periodic structure (irregular periodic structure) from five times symmetries, respectively.

In addition, although the quasicrystal metal layer 4 and the polymeric films 3 and 5 are shown in FIGS. 1A and 1B as single layers, respectively, the quasicrystal metal layer and polymeric film for a gas barrier material may be present as single layers or in a laminate form having two or more kinds thereof. In the latter case, the quasicrystal metal layer and polymeric film may have a structure of laminating two or more layers.

Further, the lamination of the quasicrystal metal layer and polymeric film may have any suitable form, and the outermost layer and the innermost layer thereof may be polymeric films considering the adhesion, and the surface protection effects. In other words, the gas barrier material may have a laminate form of the polymeric film-quasicrystal metal layer-polymeric film from the outside.

In the present embodiment, the quasicrystal metal layer may be one layer or a laminate of two or more layers. In the latter case, each quasicrystal metal layer may have the same composition or the different composition. In addition, the quasicrystal metal layer may include another composition in addition to the quasicrystal metal, but may include only a quasicrystal metal in a view of further improving thermal conductivity, heat resistance (i.e., heat insulation performance), and gas barrier properties. In other words, the quasicrystal metal layer may consist of the quasicrystal metal.

The metal species for the quasicrystal metal is not particularly limited.

Specifically, the quasicrystal metal may be an alloy of the formula Al-TM-M or an alloy of the formula Al-TM, wherein TM is at least one of a transition metal and M is at least one element selected from a semi-metal and a semi-conductor, or an alloy of the formula RE-Mg—Zn wherein RE is at least one element selected from a rare earth element or gallium.

As described above, the quasicrystal metal may be an alloy of the formula Al-TM-M and may comprise aluminum (Al), at least one of a transition metal (TM) and at least one of a semi-metal and/or semiconductor (M), or an alloy of the formula Al-TM and may comprise aluminum (Al) and at least one of transition metal (TM). The TM means at least one elements of Groups 3 to Group 11 in the Periodic Table.

In an embodiment, TM may be vanadium (V), chromium (Cr), manganese (Mn), iron (Fe), cobalt (Co), nickel (Ni), copper (Cu), niobium (Nb), molybdenum (Mo), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), and uranium (U).

In another embodiment, TM may be vanadium (V), chromium (Cr), manganese (Mn), iron (Fe), cobalt (Co), nickel (Ni), copper (Cu), ruthenium (Ru), palladium (Pd), silver (Ag), rhenium (Re), osmium (Os), and gold (Au).

The TM may be one kind of transition metal or two or more kinds of transition metals, and it is desirably one kind or two kinds of transition metals.

Furthermore, M refers to at least one of a semi-metal and/or a semiconductor.

The semi-metal is a Group 14 element in the Periodic Table, for example, silicon (Si) or germanium (Ge).

In addition, the semiconductor is Group 1, Group 2, or Group 13 element in the Periodic Table, for example, lithium (Li), magnesium (Mg), or gallium (Ga).

Desirably, M is at least one kind of element selected from lithium (Li), magnesium (Mg), silicon (Si), and germanium (Ge). Herein, M may be one kind of the metals, or two or more kinds of the metals, but desirably may be one kind or two kinds of the metals.

The composition of the Al-TM-M alloy is not particularly limited, and may include 10 atomic percent (atomic %) to 45 atomic % of the transition metal, 5 atomic % to 45 atomic % of the semi-metal and/or semiconductor, and the balance of aluminum and any impurities, based on the total amount. In $Al_{100-a-b-x}TM_aM_b$, a indicates a composition of a transition metal, $10 \le a \le 45$, for example, $10 \le a \le 20$, for another example, $14 \le a \le 20$, b indicates a composition of a semi-metal and/or a semiconductor, $5 \le b \le 45$, for example, $8 \le b \le 35$, and x indicates a composition of inevitable impurities, $0 \le x \le 0.05$).

In an embodiment, examples of the Al-TM-M alloy may be $Al_{72}Mn_{20}Si_8$, $Al_{72}V_{20}Si_8$, $Al_{40}Mn_{25}Cu_{10}Ge_{25}$, $Al_5Li_3Cu$, $Mg_{45}Pd_{14}Al_{41}$, $Al_6Li_3Au$, and $Al_{50}Mg_{35}Ag_{15}$.

In another embodiment, the Al-TM-M alloy may be $Al_5Li_3Cu$, $Mg_{45}Pd_{14}Al_{41}$, $Al_6Li_3Au$, and $Al_{50}Mg_{35}Ag_{15}$.

With the composition, the quasicrystal metal layer may provide sufficiently low thermal conductivity and sufficiently high heat resistance (i.e., excellent heat insulation performance), and may further improve gas barrier properties.

Herein, the composition of alloy is indicated in atomic %.

Furthermore, the composition of the Al-TM alloy is not particularly limited, but may be 16 atomic % to 40 atomic % of the transition metal and the balance of aluminum and inevitable impurities based on the total amount, thus $Al_{100-c-y}TM_c$; c indicates a composition of the transition metal, $16 \le c \le 40$, and y indicates a composition of inevitable impurities, $0 \le y \le 0.05$.

In another embodiment, examples of the Al-TM alloy may be $Al_{62.5}Cu_{25}Fe_{12.5}$, $Al_{73}Pd_{18.5}Mn_{8.5}$, $Al_4Mn$, $Al_{84}Cr_{16}$, $Al_{65}Cu_{20}Fe_{15}$, $Al_{65}Cu_{20}Ru_{15}$, $Al_{65}Cu_{20}Os_{15}$, $Al_{70}Pd_{20}Mn_{10}$, $Al_{70}Pd_{20}Re_{10}$, $Al_4Mn$, Al—Fe, Al—Pd, $Al_{70}Ni_{15}Co_{15}$, $Al_{65}Cu_{20}Co_{15}$, $Al_{75}Pd_{15}Fe_{10}$, or $Al_{70}Mn_{17}Pd_{13}$.

In another embodiment, examples of the Al-TM alloy may be $Al_{62.5}Cu_{25}Fe_{12.5}$, $Al_{70}Pd_{20}Mn_{10}$, $Al_{65}Cu_{20}Fe_{15}$, $Al_{65}Cu_{20}Ru_{15}$, $Al_{65}Cu_{20}Os_{15}$, $Al_{70}Pd_{20}Mn_{10}$, $Al_{70}Pd_{20}Re_{10}$, $Al_{70}Ni_{15}Co_{15}$, $Al_{65}Cu_{20}Co_{15}$, $Al_{75}Pd_{15}Fe_{10}$, or $Al_{70}Mn_{17}Pd_{13}$.

With the composition, the quasicrystal metal layer may have sufficiently low thermal conductivity and sufficiently high heat resistance (i.e., excellent heat insulation performance), and may further improve gas barrier properties.

Alternatively, the quasicrystal metal may be an RE-Mg—Zn alloy including at least one kind of rare earth element (RE), magnesium (Mg), and zinc (Zn). Herein, RE indicates at least one kind of elements selected from the group consisting of rare earth elements or gallium (Ga).

The rare earth element is not particularly limited, but may be scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), or lutetium (Lu).

In an embodiment, the rare earth element may be yttrium (Y), europium (Eu), gadolinium (Gd), terbium (Tb), dysprosium (Dy), holmium (Ho), and the like.

Herein, RE may be one kind of rare earth elements or gallium (Ga), or two or more kinds of the rare earth elements, for example, one kind or two kinds of the rare earth elements.

In an embodiment, the composition of RE-Mg—Zn alloy is not particularly limited, and may be 18 atomic % to 36 atomic % of magnesium, 21 atomic % to 70 atomic % of zinc, and the balance of a rare earth element and any impurities [$RE_{100-d-e-z}Mg_dZn_e$; d is a composition of magnesium, $18 \le d \le 36$, e is a composition of zinc, $21 \le e \le 70$, z is a composition of inevitable impurities, $0 \le z \le 0.05$].

In one embodiment, examples of the RE-Mg—Zn alloy may be $Ga_{10}Mg_{18}Zn_{21}$, $Zn_{56}Mg_{36}Y_8$, or $Zn_{56}Mg_{36}Gd_8$.

With the composition, the quasicrystal metal layer may have sufficiently low thermal conductivity and sufficiently high heat resistance (i.e., excellent heat insulation performance), and may further improve the high gas barrier properties.

Among the quasicrystal metals, for further reducing the thermal conductivity and further improving the heat resistance (i.e., excellent heat insulation performance) or the gas barrier properties and the like, the quasicrystal metal may be an $Al_{100-a-b-x}TM_aM_b$ alloy (wherein TM is at least one transition metal selected from vanadium (V), chromium (Cr), manganese (Mn), iron (Fe), cobalt (Co), nickel (Ni), copper (Cu), ruthenium (Ru), palladium (Pd), silver (Ag), rhenium (Re), osmium (Os), and gold (Au); M is at least one element selected from lithium (Li), magnesium (Mg), silicon (Si) and germanium (Ge); a indicates a composition of the transition metal, $10 \le a \le 20$; b indicates a composition of the element, $8 \le b \le 35$; x indicates a composition of inevitable impurities, $0 \le x \le 0.05$), or an $Al_{100-c-y}TM_c$ alloy (wherein TM is at least one transition metal selected from vanadium (V), chromium (Cr), manganese (Mn), iron (Fe), cobalt (Co), nickel (Ni), copper (Cu), ruthenium (Ru), palladium (Pd), silver (Ag), rhenium (Re), osmium (Os), and gold (Au); c indicates a composition of the transition metal, $16 \le c \le 40$; y indicates a composition of inevitable impurities, $0 \le y \le 0.05$), or $RE_{100-d-e-z}Mg_dZn_e$ alloy (wherein RE is at least one rare earth element selected from yttrium (Y), europium (Eu), gadolinium (Gd), terbium (Tb), dysprosium (Dy), and holmium (Ho); d indicates a composition of magnesium, $18 \le d \le 36$; e indicates a composition of zinc, $21 \le e \le 70$; z indicates a composition of inevitable impurities $0 \le z \le 0.05$), for example, $Al_{62.5}Cu_{25}Fe_{12.5}$, $Al_{70}Pd_{20}Mn_{10}$, or $Y_8Mg_{36}Zn_{56}$.

In addition, the thickness of the quasicrystal metal layer is not particularly limited.

In an embodiment, the thickness (d) of the quasicrystal metal layer may be less than about 1 millimeter (mm), for example, may range from about 0.01 micrometer (μm) to about 10 μm, and for another example, may range from about 0.05 μm to about 5 μm.

Also, when the thickness is more than about 1 mm, it may decrease the heat resistance and deteriorate the workability such as the flexibility.

As above, since the thin quasicrystal metal layer has excellent workability, the bonding part of the gas barrier material may be easily and closely attached to the main body of the vacuum insulation material.

In addition, with the thickness, the gas barrier material may effectively suppress and/or inhibit the heat bridge through which heat inflows from the surface of vacuum insulation material, so as to improve the heat insulation performance and to enhance the gas barrier properties.

Also, in the specification, the thickness of quasicrystal metal layer means the maximum thickness of the quasicrystal metal layer.

The gas barrier material according to the present embodiment may have low thermal conductivity considering the heat insulation performance and the further improved reducing effects on the heat bridge and the like. Thereby, the quasicrystal metal layer may also have low thermal conductivity.

In an embodiment, the quasicrystal metal layer may have intrinsic thermal conductivity ($\lambda$) of less than or equal to about 10 watts per meter-kelvin (W/m·K) (hereinafter, also simply referred to "thermal conductivity"), for example, intrinsic thermal conductivity of less than or equal to about 5 W/m·K. With the thermal conductivity, it may effectively suppress the heat bridge compared to the currently-used rolled aluminum foil.

Also, it is more desirable as the thermal conductivity of the quasicrystal metal layer is lower, so the lowest limit thereof is not particularly limited, but may generally be 0 W/m·K, but it may be sufficient if greater than or equal to about 1 W/m·K, for example, greater than or equal to about 3 W/m·K. With the thermal conductivity, the gas barrier material may have excellent heat insulation performance.

Also, the thermal conductivity of the quasicrystal metal layer may be measured by the known methods, herein thermal conductivity of the quasicrystal metal layer may be measured by the following method.

Measurement of Intrinsic Thermal Conductivity of Quasicrystal Metal Layer

A quasicrystal metal (alloy) having a predetermined composition is formed in a bulk shape (diameter: about 20 mm$\phi$, thickness: about 5 mm) using an arc melting furnace, and then the alloy is heat-treated under vacuum ($10^{-3}$ Pa) at 650° C. for 24 hours to provide a bulk structure.

Sequentially, the obtained bulk structure is polished on the surface thereof to provide a sample having a cylinder shape of diameter: 10 mm$\phi$, thickness: 1 nm to 3 mm. For the sample, the intrinsic thermal conductivity (thermal conductivity) ($\lambda$) (W/m·K) is measured using a laser flash method.

As described above, the heat bridge problem is solved by using the disclosed gas barrier material. Considering the effect of suppressing the heat bridge, the gas barrier material may be thin and may have low thermal conductivity.

The quasicrystal metal layer may have high heat resistance, for example, heat resistance (R) of greater than or equal to about 800 K/W, for another example, heat resistance (R) of greater than about 50,000 K/W, for a further example, heat resistance (R) of greater than or equal to about 100,000 K/W, and for yet another example, heat resistance (R) of greater than or equal to about 200,000 K/W.

Also, it is more desirable as the quasicrystal metal layer has higher heat resistance, so the upper limit thereof is not particularly limited, but generally, it is sufficient if less than or equal to about 1,000,000 KW, for example, less than or equal to about 3,000,000 K/W, or less than or equal to about 500,000 KW.

The quasicrystal metal layer having either the ranged heat resistance or the ranged thickness may effectively suppress and/or inhibit generation of the heat bridge while ensuring the excellent workability compared to the conventional aluminum foil.

Also, in the specification, the term "heat resistance" indicates the heat resistance perpendicular to the thickness direction of the metal foil per unit area, and the heat resistance (R) (K/W) is determined by the thickness (d) and the thermal conductivity ($\lambda$) of the quasicrystal metal layer, specifically, may be calculated by the following Equation 1.

Heat resistance (K/W) of quasicrystal metal layer=
1(m)/[thermal conductivity (W/m·K) of
quasicrystal metal layer×1(m)×thickness(m) of
quasicrystal metal layer]   Equation 1

The quasicrystal metal layer may have excellent gas barrier properties. Accordingly, the gas barrier material according to one embodiment may also have excellent gas barrier properties.

Specifically, the quasicrystal metal layer may have aqueous vapor transmittance of less than or equal to about $8\times10^{-3}$ (g/m²·day), for example, less than about $5\times10^{-3}$ (g/m²·day).

When the aqueous vapor transmittance is greater than about $8\times10^{-3}$ (g/m²·day), the gas barrier properties of the gas barrier material may be deteriorated, and the vacuum degree inside the vacuum insulation material may not be maintained for a long time.

Also, it is more desirable as the quasicrystal metal layer has lower aqueous vapor transmittance, so the lower limit is not particularly restricted, but it is sufficient generally if greater than or equal to about $1\times10^{-7}$ (g/m²·day).

In the specification, the term "aqueous vapor transmittance (g/m²·day)" means values measured at a temperature of 40° C. and relative humidity of 90% using Aquatran (manufactured by MOCON) based on ISO15106-3.

According to an embodiment, the method of manufacturing the quasicrystal metal is not particularly limited.

For example, the quasicrystal metal is obtained by melting the raw metals in a desirable atomic ratio using an arc melting furnace under an inert atmosphere (for example, an argon atmosphere) to provide a mother alloy; and performing heat treatment at an appropriate temperature (for example, 650° C. to 950° C.) for an appropriate time (for example, 12 hours to 24 hours) to provide a quasicrystal bulk body according to a bulk method.

In the same manner, the method of manufacturing a quasicrystal metal layer is not particularly limited, and may be according to the known method.

In addition, the quasicrystal metal layer may be commercially available in the markets.

The specific method of manufacturing a quasicrystal metal layer may include rolling, deposition (for example, PLD: Pulse Laser Deposition), sputtering, rapid solidification, or the like.

Among the methods, according to the rolling method, the obtained bulk is rolled to provide a quasicrystal metal layer.

According to PLD or sputtering, a sputtering target is provided using a raw metal in a desirable atomic ratio, and the sputtering target and the substrate are disposed in a vacuum chamber and appropriately vacuumized in the chamber (for example, at less than or equal to about $10^{-4}$ Pa)and coated up to the desirable film thickness by adjusting the substrate temperature (for example, room temperature of 25° C.) to provide a quasicrystal metal layer.

Also, the laser used for the coating is not particularly limited, but may include, for example, an Nd pulse laser ($\lambda$: 527 nm, $\tau$=250 fs, 10 Hz).

In addition, the coating condition is not particularly limited, but it may be performed under the conditions, for example, of a distance between anode and cathode of about 4 mm, of a distance between the target and the substrate of about 50 mm, at a substrate temperature of room temperature of 25° C., and at a substrate bias voltage of about −400 V.

According to the rapid solidification, the quasicrystal metal layer is formed in a quenched thin ribbon by providing a mother alloy by an arc melting furnace as above and then using a liquid quenching solidification device having a single roll to quench the mother alloy; or the quasicrystal metal layer is formed in a quenched thin ribbon by providing a mother alloy by an arc melting furnace as above, adding the mother alloy into a quartz nozzle, melting the mother alloy by heating at a high frequency under an inert atmosphere (for example, an argon atmosphere), spraying the melted metal on a rotating copper roll at an appropriate speed while adding the inert gas (for example, argon gas) pressure, and forming the quasicrystal metal layer in a quenched thin ribbon shape.

Among the methods, the rolling method and the sputtering method are preferable.

In other words, the quasicrystal metal layer may be obtained from the rolling or the sputtering.

Since the obtained quasicrystal metal layer has a thin thickness, heat returned from peripheral parts along the gas barrier material may be suppressed to be lowered. Thereby, the gas barrier material including the quasicrystal metal layer may effectively suppress and/or inhibit the heat bridge of the vacuum insulation material. In addition, for the same reason, due to the thin gas barrier material, the workability (flexibility) is enhanced, the bonding part which inhibits the urethane injection is easily bent, and the bonding part is easily and closely attached to the main body of the vacuum insulation material.

Also, the quasicrystal metal layer may be a single layer or a laminate structure of two or more kinds of layers.

The quasicrystal metal layer may be laminated with a polymeric film to provide a gas barrier material.

Herein, the polymeric film may be one layer or a laminate of two or more kinds thereof.

The composition of the polymeric film may not be particularly limited, but generally, the polymeric film (polymeric film 5 in FIGS. 1A and 1B) at the inner side (the side accommodating the core material or the gas adsorbing agent) from the quasicrystal metal layer may be a film having thermal bonding properties, and the polymeric film (polymeric film 3 in FIGS. 1A and 1B) at the outside (the side contacting the exterior atmosphere) from the quasicrystal metal layer may be a film having a surface protective effect (surface protective film).

Herein, the thermal bonding film is not particularly limited as long as it may be adhered by a general sealing method (for example, a heat sealing method).

The material of the thermal bonding film may be, for example, a polyolefin such as low density polyethylene, linear low density polyethylene, high density polyethylene, polypropylene, and the like, or a thermoplastic resin such as an ethylene-vinyl acetate copolymer, an ethylene-methacrylic acid copolymer, an ethylene-acrylic acid ester copolymer, an ethylene-methacrylic acid ester copolymer, a polyacrylonitrile, and the like.

The material may be used singularly or as a mixture of two or more kinds thereof.

The thermal bonding film may be a single layer or a laminate of two or more layers. In the case of the latter, each layer may have the same composition or different compositions.

The thickness of the thermal bonding film is not particularly limited, and may be the same thickness as a known thickness. For example, the thermal bonding film may have a thickness of about 10 μm to about 100 μm. When it is thinner than about 10 μm, the contact strength may be insufficient on the heat seal, and when is thicker than about 100 μm, the workability such as flexibility may be deteriorated.

When the thermal bonding film has a laminate structure of two or more layers, the thickness of the thermal bonding film means the total thickness. The thickness of each layer may be the same or different in this case.

The surface protective film is not particularly limited, and may be a material generally used as the gas barrier material.

The material of the surface protective film may be, for example, a polyamide (nylon) (PA) such as nylon-6, nylon-66, and the like, a polyester such as polyethylene terephthalate (PET), polyethylene naphthalate (PEN), polybutylene terephthalate (PBT), and the like, a polyolefin such as polyethylene (PE), polypropylene (PP), polystyrene (PS), and the like, polyimide, polyacrylate, polyvinyl chloride (PVC), polyvinylidene chloride (PVDC), an ethylene vinyl alcohol copolymer (EVOH), a polyvinyl alcohol resin (PVA), polycarbonate (PC), polyether sulfone (PES), polymethyl methacrylate (PMMA), a polyacrylonitrile (PAN) resin, and the like.

These films may include several additives or stabilizers, for example, an antistatic agent, an ultraviolet (UV) blocking agent, a plasticizer, a lubricant, or the like.

The material may be used singularly or as a mixture of two or more kinds thereof.

The surface protective film may be a single layer or a laminate of two or more layers.

In the latter case, each layer may have the same composition or a different composition.

The thickness of the surface protective film is not particularly limited, and may be the same as a known thickness. For example, the surface protective film may have a thickness ranging from about 10 μm to about 100 μm. When it is less than about 10 μm, the barrier layer is not sufficiently protected and cracks and the like may be generated. When it is greater than about 100 μm, the workability such as flexibility may be deteriorated like the thermal bonding film.

When the surface protective film has a laminate structure of two or more layers, the thickness means the total thickness. The thickness of each layer may be the same or different in this case.

The thickness of the gas barrier material is not particularly limited.

For example, the thickness of the gas barrier material may be about 20 μm to about 210 μm.

The thin gas barrier material may suppress or inhibit a heat bridge more effectively and improve heat insulation performance, and further improve gas barrier properties and workability.

The gas barrier material according to the present embodiment may have low thermal conductivity considering heat insulation performance. Accordingly, a vacuum insulation material (gas barrier material) may also have low thermal conductivity.

For example, the vacuum insulation material (gas barrier material) may have thermal conductivity ($\lambda$) of less than or equal to about 0.01 W/m·K, or for example, less than or equal to about 0.005 W/m·K. The vacuum insulation material having the above thermal conductivity may have excellent heat insulation performance.

On the other hand, since the lower thermal conductivity is more desirable, the vacuum insulation material (gas barrier material) has no particular limit to a lowest thermal conductivity, but the thermal conductivity may be greater than or equal to about 0.0005 W/m·K.

The thermal conductivity of the vacuum insulation material (gas barrier material) may be measured in a known method, but the thermal conductivity (mW/m·K) of the vacuum insulation material (gas barrier material) of this disclosure is measured using HFM436 (manufactured by NETZSCH, heat flow meter, 100 mm×100 mm).

The method of manufacturing a vacuum insulation material is not particularly limited, and may include any known methods or appropriately modified methods.

For example, the method may include: (i) preparing two sheets of gas barrier materials, folding one of the gas barrier materials (laminate film) and heat bonding between thermal bonding films disposed in the ends of gas barrier materials facing each other to provide an envelope-shaped gas barrier material, injecting a core material and a gas adsorbing agent into the gas barrier material, and heat bonding between the thermal bonding films disposed in the opening of the envelope-shaped laminate film under the reduced pressure; or (ii)

disposing two sheets of gas barrier materials (laminate film) to face the thermal bonding films to each other, heat bonding between the thermal bonding films disposed in the ends of each gas barrier material to provide an envelope-shaped gas barrier material, injecting a core material and a gas adsorbing agent into the envelope-shaped gas barrier material, and heat bonding between the thermal bonding films disposed around the opening of the envelope-shaped laminate film under the reduced pressure.

Core Material

The core material is a framework of a vacuum insulation material to provide a vacuum space. Herein, the core material is not particularly limited, and may include any known core material.

For example, the core material may include: an inorganic fiber such as glass wool, rock wool, alumina fiber, a metal fiber formed of a metal having low thermal conductivity, and the like; an organic fiber such as a synthetic fiber like polyester or polyamide, acryl, polyolefin, and the like; a cellulose manufactured from wood pulp; a natural fiber such as cotton, hemp, cloth, wool, silk, and the like; a recycled fiber such as rayon and the like; a semi-synthetic fiber such as acetate and the like; and the like.

The core materials may be used alone or as a mixture of two or more. Among these materials, the glass wool may be used.

The core material formed of these materials has high elasticity and low thermal conductivity of the fiber itself, and a low cost for industrial use.

Gas Adsorbing Agent

The gas adsorbing agent adsorbs gasses such as vapor or air (oxygen and nitrogen) remaining in or entering the closely sealed space of the vacuum insulation material.

The gas adsorbing agent is not particularly limited, but may include any known gas adsorbing agents.

For example, the gas adsorbing agent may include a chemical adsorption material such as calcium oxide (quick lime) and magnesium oxide, a physical adsorption material such as zeolite, open-cell polyurethane, a lithium compound, a chemical adsorptive and physical adsorptive copper ion exchange ZSM-5 type of zeolite, a 13× molecular sieve, or the like.

The gas adsorbing agent material may be used singularly or as a mixture of two or more kinds thereof.

As described above, the vacuum insulation material according to present embodiment has low thermal conductivity, effectively suppresses generation of a heat bridge, and also has improved gas barrier properties and workability. Accordingly, the vacuum insulation material according to the present embodiment may be appropriately employed for a device required to maintain the heat insulation performance, for example, a freezer, a refrigerator, a vending machine, a hot water supply, a heat insulation material for a building, a heat insulation material for an automobile, a thermostatic box, or the like.

EXAMPLES

The effects of the embodiments are described referring to the following examples and comparative examples. However, the technical scope of the present invention is not limited to the following examples.

In addition, the operation is performed at room temperature of 25° C. unless mentioned otherwise. Also, unless mentioned otherwise, "%" and "part" each refer to "wt %" and "parts by weight".

Example 1

Using an arc melting furnace, the bulk body (20 mmϕ, thickness of about 5 mm) of $Al_{62.5}Cu_{20}Fe_{12.5}$ (atomic ratio) alloy is prepared. The $Al_{62.5}Cu_{20}Fe_{12.5}$ alloy is melted, ground, and sintered and then bonded on a copper sputtering support plate having a diameter of 200 mmϕ in a thickness of 3 mm to provide a sputtering target.

In the vacuum chamber, the sputtering target and polyethyleneterephthalate (PET) film (100 mm×300 mm×52 μm) are disposed to face each other, and are vacuumized to $10^{-6}$ Pa in the chamber and injected with argon gas to a pressure of 0.3 Pa.

Also, a first quasicrystal metal layer having a thickness of 100 nm is provided on the PET film while providing power of 150 W, a substrate temperature of room temperature (25° C.), and a coating speed of 250 nm/h.

Thereby the obtained first quasicrystal metal layer is measured for intrinsic thermal conductivity (λ) (W/m·K), heat resistance (R) (K/W), and aqueous vapor transmittance (g/m²·day).

The results are shown in the following Table 1.

Example 2

A second quasicrystal metal layer is manufactured in accordance with the same procedure as in Example 1, except that the quasicrystal metal layer has a thickness of 7 μm.

Thereby, the second obtained quasicrystal metal layer is measured for intrinsic thermal conductivity (λ) (W/m·K), heat resistance (R) (K/W), and aqueous vapor transmittance (g/m²·day).

The results are shown in the following Table 1.

Example 3

Using an arc melting furnace, a bulk body (20 mmϕ, thickness about 5 mm) of $Al_{70}Pd_{20}Mn_{10}$ (atomic ratio) alloy is prepared. The $Al_{70}Pd_{20}Mn_{10}$ alloy is melted, ground, sintered, and then bonded on a copper sputtering support plate having a diameter of 200 mmϕ in a thickness of 3 mm to provide a sputtering target.

In the vacuum chamber, the sputtering target and the polyethylene terephthalate (PET) film (100 mm×300 mm×52 μm) are disposed to face each other and vacuumized to $10^{-6}$ Pa in the chamber, and injected with argon gas to a pressure of 0.3 Pa.

Meanwhile, while providing power of 150 W, a substrate temperature of room temperature (25° C.), and a coating speed of 250 nm/h, a third quasicrystal metal layer having a thickness of 100 nm is provided on a PET film.

The obtained third quasicrystal metal layer is measured for intrinsic thermal conductivity (λ) (W/m·K), heat resistance (R) (K/W), and aqueous vapor transmittance (g/m²·day). The results are shown in the following Table 1.

Comparative Example 1

A rolled aluminum foil (7 μm) is used.
The aluminum foil is measured for intrinsic thermal conductivity (λ) (W/m·K), heat resistance (R) (K/W), and aqueous vapor transmittance (g/m²·day).

The results are shown in the following Table 1.

Comparative Example 2

An Al deposition film having a thickness of 100 nm is formed on a polyethylene terephthalate film having a thickness of 12 μm. The Al deposition film is measured for intrinsic thermal conductivity (λ) (W/m·K), heat resistance (R) (K/W), and aqueous vapor transmittance (g/m²·day).

The results are shown in the following Table 1.

TABLE 1

| | Composition (atomic %) | Thickness (μm) | Intrinsic thermal conductivity (λ) (W/m · K) | Heat resistance (R) (K/W) | Aqueous vapor transmittance (g/m² · day) |
|---|---|---|---|---|---|
| Example 1 | $Al_{62.5}Cu_{25}Fe_{12.5}$ | 0.1 | 1.2 | 8,333,333 | $<5 \times 10^{-3}$ |
| Example 2 | $Al_{62.5}Cu_{25}Fe_{12.5}$ | 7 | 1.2 | 119,047 | $<5 \times 10^{-4}$ |
| Example 3 | $Al_{70}Pd_{20}Mn_{10}$ | 0.1 | 3.4 | 2,941,176 | $<5 \times 10^{-3}$ |
| Comparative Example 1 | Al foil | 7 | 200 | 714 | $<5 \times 10^{-4}$ |
| Comparative Example 2 | Al deposition film | 0.1 | 200 | 50,000 | $4 \times 10^{-2}$ |

From the results shown in Table 1, it is confirmed that the first to third quasicrystal metal layers according to Examples 1 to 3 have significantly higher heat resistance than the aluminum foil according to Comparative Example 1 or the aluminum deposition film according to Comparative Example 2.

In addition, it is confirmed that the first to third quasicrystal metal layers according to Examples 1 to 3 have significantly improved gas barrier property (aqueous vapor transmittance is significantly lower) compared to the aluminum deposition film according to Comparative Example 2.

From the results, it is confirmed that the vacuum insulation material comprising an gas barrier material containing the quasicrystal metal according to the present invention may improve heat resistance and suppress the influence of the heat bridge while maintaining high gas barrier properties compared to the vacuum insulation material using a conventional aluminum foil or an aluminum deposition layer in an gas barrier material, and it may also impart the excellent heat insulation performance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vacuum insulation material comprising:
   a core material; and
   a gas adsorbing agent,
   wherein the core material and the gas absorbing agent are interposed between a pair of gas barrier materials,
   wherein at least one of the pair of gas barrier materials comprises a quasicrystal metal layer comprising a quasicrystal metal.

2. The vacuum insulation material of claim 1, wherein the quasicrystal metal layer has an intrinsic thermal conductivity of less than or equal to about 10 watts per meter-Kelvin.

3. The vacuum insulation material of claim 1,
   wherein the quasicrystal metal is an alloy of the formula Al-TM-M or an alloy of the formula Al-TM, wherein TM is at least one of a transition metal and M is at least one element selected from a semi-metal and a semiconductor, or
   wherein the quasicrystal metal is an alloy of the formula RE-Mg—Zn, wherein RE is at least one element selected from a rare earth element or gallium.

4. The vacuum insulation material of claim 3,
   wherein the quasicrystal metal is an alloy of the formula $Al_{100-a-b-x}TM_aM_b$, 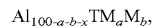

wherein TM is at least one transition metal selected from vanadium, chromium, manganese, iron, cobalt, nickel, copper, ruthenium, palladium, silver, rhenium, osmium, and gold,
   wherein M is at least one element selected from lithium, magnesium, silicon, and germanium,
   wherein a is 10≤a≤20,
   wherein b is 8≤b≤35, and
   wherein x is 0≤x≤0.05,
   wherein the quasicrystal metal is an alloy of the formula $Al_{100-c-y}TM_c$,
   wherein TM is at least one transition metal selected from vanadium, chromium, manganese, iron, cobalt, nickel, copper, ruthenium, palladium, silver, rhenium, osmium, and gold,
   wherein c is 16≤c≤40,
   wherein y is 0≤y≤0.05), or
   wherein the quasicrystal metal is an alloy of the formula $RE_{100-d-e-z}Mg_dZn_e$, 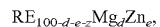

wherein RE is at least one rare earth element selected from yttrium, europium, gadolinium, terbium, dysprosium, and holmium,
   wherein d is 18≤d≤36,
   wherein e is 21≤e≤70, and
   wherein z indicates a composition of impurities and is 0≤z≤0.05.

5. The vacuum insulation material of claim 4, wherein the quasicrystal metal is $Al_{62.5}Cu_{25}Fe_{12.5}$, $Al_{70}Pd_{20}Mn_{10}$, or $Y_8Mg_{36}Zn_{56}$.

6. The vacuum insulation material of claim 1, wherein the quasicrystal metal layer is formed by rolling or sputtering.

7. The vacuum insulation material of claim 1, wherein at least one of the pair of gas barrier materials comprises a laminate of the quasicrystal metal and a polymeric material.

8. The vacuum insulation material of claim 1, wherein the quasicrystal metal layer comprises the quasicrystal metal.

* * * * *